United States Patent
Lankster

(10) Patent No.: US 6,301,827 B1
(45) Date of Patent: Oct. 16, 2001

(54) JAPANESE BEETLE TRAP

(76) Inventor: Garland F. Lankster, Box 108 McVay, Brocton, IL (US) 61917

( * ) Notice: Subject to any disclaimer, the term of this patent is extended or adjusted under 35 U.S.C. 154(b) by 0 days.

(21) Appl. No.: 09/406,392

(22) Filed: Sep. 27, 1999

(51) Int. Cl.[7] ............................................. A01M 1/10
(52) U.S. Cl. ............................................. 43/107; 43/122
(58) Field of Search ........................................ 43/107, 122

(56) References Cited

U.S. PATENT DOCUMENTS

| | | | |
|---|---|---|---|
| 1,572,568 | * 2/1926 | Smith | 43/107 |
| 1,772,989 | * 8/1930 | Emley | 43/107 |
| 1,783,631 | * 12/1930 | Sladky | 43/107 |
| 1,786,599 | * 12/1930 | Bullock | 43/107 |
| 1,787,421 | * 12/1930 | Ruddell | 43/107 |
| 1,865,713 | * 7/1932 | Taylor | 43/107 |
| 1,882,380 | * 10/1932 | Braun | 43/107 |
| 1,919,916 | * 7/1933 | Taylor | 43/107 |
| 1,968,953 | * 8/1934 | Metzger | 43/107 |
| 1,968,954 | * 8/1934 | Metzger | 43/107 |
| 1,971,367 | * 8/1934 | Brooke | 43/107 |
| 2,020,283 | * 11/1935 | Armstrong | 43/107 |
| 2,193,492 | * 3/1940 | Richardson | 43/107 |
| 3,939,802 | 2/1976 | Neff . | |
| 4,002,146 | 1/1977 | Neff . | |
| 4,019,459 | * 4/1977 | Neff | 119/223 |
| 4,036,189 | * 7/1977 | Neff | 119/51.04 |
| 4,328,626 | * 5/1982 | Johnson | 43/107 |
| 4,476,647 | * 10/1984 | Hall, Jr. | 43/122 |
| 4,557,069 | * 12/1985 | Caldwell | 43/122 |
| 4,706,410 | * 11/1987 | Briese | 43/107 |
| 4,718,193 | * 1/1988 | Rosselli | 43/122 |
| 4,944,114 | 7/1990 | Burton et al. . | |
| 5,133,150 | 7/1992 | Briese . | |
| 5,251,113 | * 10/1993 | Wagoner et al. | 362/190 |
| 5,815,980 | * 10/1998 | Clarke, Jr. | 43/113 |

* cited by examiner

Primary Examiner—Kurt Rowan
(74) Attorney, Agent, or Firm—Michael Berns

(57) ABSTRACT

A trap for insects, primarily the Japanese beetle, which is supported on the surface of a body of water by a floating support, the support having an aperture which holds an upright, elongated tube. A funnel is fitted into the top end of the tube, and a scent-based means for luring insects into the funnel is supported by the upwardly facing entrance opening of the funnel. The insects are attracted to the scent-based means and fall through the funnel, tube, and aperture, onto the surface of water below the trap. The trap may be held upright by a means, such as a pipe anchored to the ground, the trap being vertically slidingly coupled to the means for holding the trap upright.

5 Claims, 2 Drawing Sheets

JAPANESE BEETLE TRAP

BACKGROUND OF THE INVENTION

This invention relates generally to the field of insect traps, and, more particularly, to an improved trap for insects, primarily the Japanese beetle, in which the trap rests upon, and lures the insects to, the surface of a body of water for both trapping insects and feeding fish in ponds or lakes.

The Japanese beetle, *Popillia japonica,* since first being introduced into the United States in New Jersey, has spread over the eastern United States, and has also into Midwestern and Western states. Unlike in its native Japan, the natural enemies of the Japanese Beetles are not readily found in the United States. The beetle is known to destroy the foliage and fruit of hundreds of species of trees, shrubs, vines, and crops. Often, skeletonized leaves are left in the wake of this insect. Both the adult and grubs of this insect are destructive to the crops. The adult beetle is typically prevalent from June to August. Once the beetle becomes established in an area, it is difficult to rid the beetles from that area.

There are various control methods available for minimizing the effect of the Japanese beetle on plants and crops. Pesticides are occasionally used, but these chemicals are expensive and may be environmentally or socially dangerous, creating risks to people and wildlife. Often, the risk of using pesticides outweighs the benefit to the user. Biological controls may be used, such as introducing natural enemies to the beetles' habitat, but these controls may be expensive, time-consuming, risky, and not available to everyone.

Mechanical traps are also available to suppress the beetle, but the prior art traps in use do not contain the features of the present invention. While prior art mechanical traps are somewhat successful in capturing a percentage of beetles that are attracted to the traps, far more beetles may be led to the traps than those that may have been in the vicinity, or that are actually captured by the traps. For this reason, crops surrounding prior art traps are actually more at risk than crops without traps. The prior art traps need to be constantly maintained, as accumulation of dead beetles within the traps produces ammonia which deters further beetles from entering the traps. The beetles attracted toward the traps yet deterred from entering them may go on to destroy nearby crops.

U.S. Pat. No. 3,939,802, to Neff, discloses an insect trap comprising a floating canopy which houses a light source attractant, and a fan, which blows the attracted insects toward the water underneath the canopy. This trap requires the use of electrical power to operate the light attractant and fan, which limits the trap's flexibility of use and maintenance. In addition, the Japanese beetle, which tends to stay away from water, may not fly close enough to the surface of the water to be directed by the fan. The present invention is more suitable than the Neff trap for capturing a Japanese beetle.

U.S. Pat. No. 4,944,114, to Barton et al., discloses a dome-covered trap using a light-based attractant and a pair of nylon cords which revolve about a rotating shaft, knocking insects to the surface of the water below. This trap also requires electrical power to operate, and is not as well suited to the Japanese Beetle as is the present invention.

There is a need in the art for a passive, economical trap that requires no electrical power to use, that is simple to maintain, and that will lead insects, including the Japanese beetle, away from plants and towards water. There is a need for a Japanese beetle trap that can provide a source of food for aquatic animals. There is a further need in the art for a Japanese beetle trap that does not need to be emptied, and that can attract beetles continuously, without deterring future beetles from entering the trap.

SUMMARY OF THE INVENTION

These needs and others are met by an improved trap for insects, primarily the Japanese beetle, which comprises: a buoyant means for supporting the trap on a body of water; an elongated, hollow tube which is over an aperture in the buoyant means; a means for directing the insects into the tube, which is fitted into the top end of the tube; and a scent-based means for luring the insect into the means for directing, the means for luring being supported by the means for directing the insect. The buoyant means allows the trap to rest upon the surface of a body of water. The aperture within the buoyant means, in combination with the means for directing the insect and the tube, defines a pathway through which the trapped insect falls to the surface of the water below. The elongated, hollow tube allows insects, especially Japanese beetles, to fly towards the means for luring at the top of the tube without being deterred by the water below, and also provides a means for directing the insects towards the surface of the water. The means for directing the insect into the tube preferably is a funnel-shaped cone with a smooth surface, having an exit opening that preferably extends into the tube and is small enough so that the insects cannot escape once they enter the tube. The means for luring the insect into the means for directing the insect preferably is fitted into the entrance opening of the means for directing the insect. This means for luring is safe, and does not require electrical power. The design of the invention prevents dead insects from accumulating inside of the invention, and the trap can continue to lure and trap insects, and thus provide food for aquatic animals in the water below, as long as the scent exists on the trap. The trap can be anchored and held upright by an apparatus such as a rod or pipe anchored to the ground beneath the water, the trap being vertically slidingly coupled to the means. This allows for changes in water surface elevation, in the simplest and most economical manner known.

Other objects, advantages, and novel features of the invention will become apparent from the following detailed description and appended claims, when taken in conjunction with the accompanying drawings.

Figure 1:
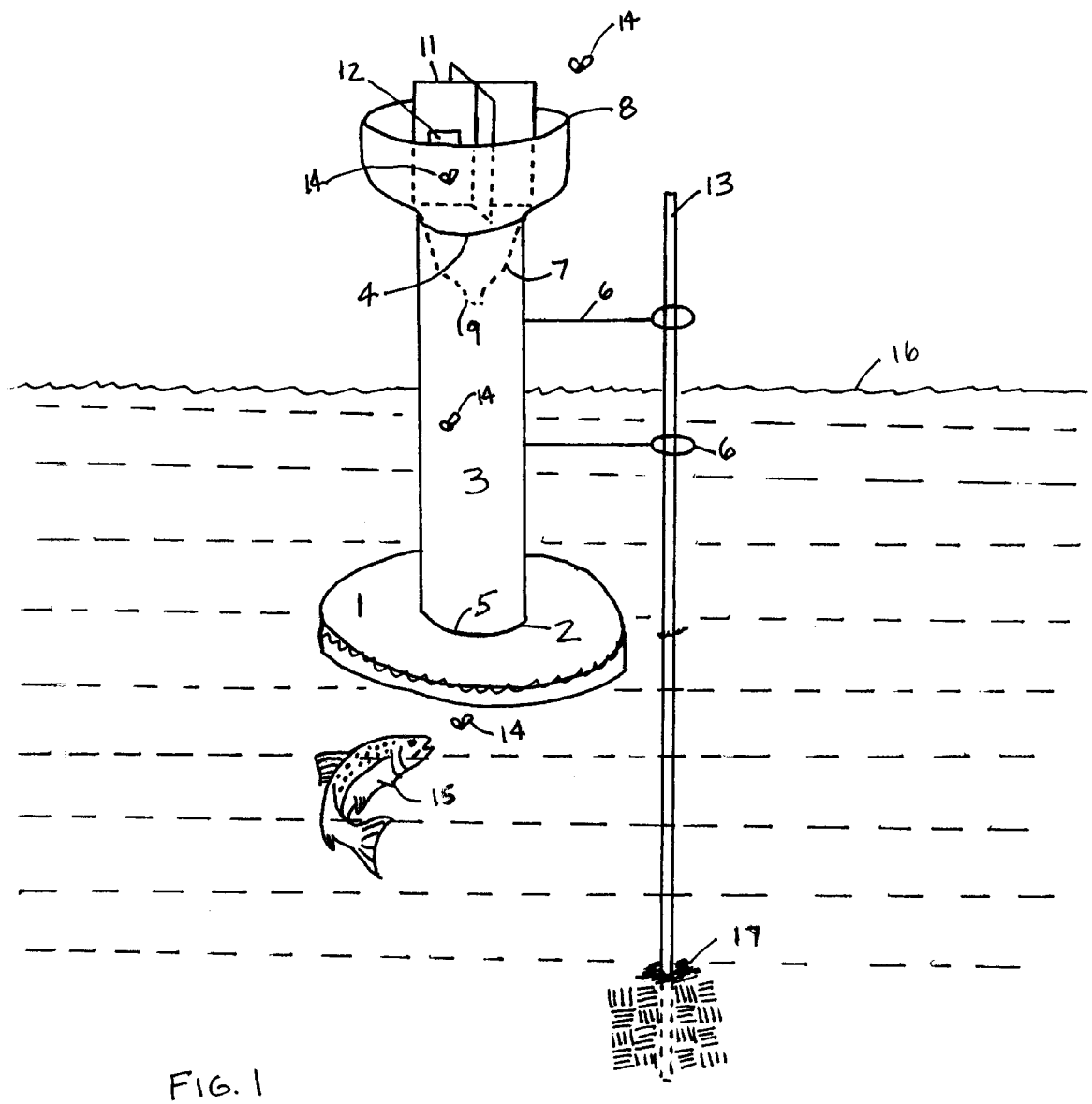
FIG. 1 is a side view of a preferred embodiment of the invention.

LIST OF PARTS USED IN THE DRAWINGS 1 floating support
2 aperture
3 hollow cylinder
4 open top end
5 open bottom end
6 eyebolts
7 funnel
8 entrance opening
9 exit opening
10 pathway
11 scent-based means for luring 12 attractant
13 means for holding the trap upright
14 insect
15 fish
16 water surface
17 ground surface

DETAILED DESCRIPTION OF THE PREFERRED EMBODIMENT

Figure 2:
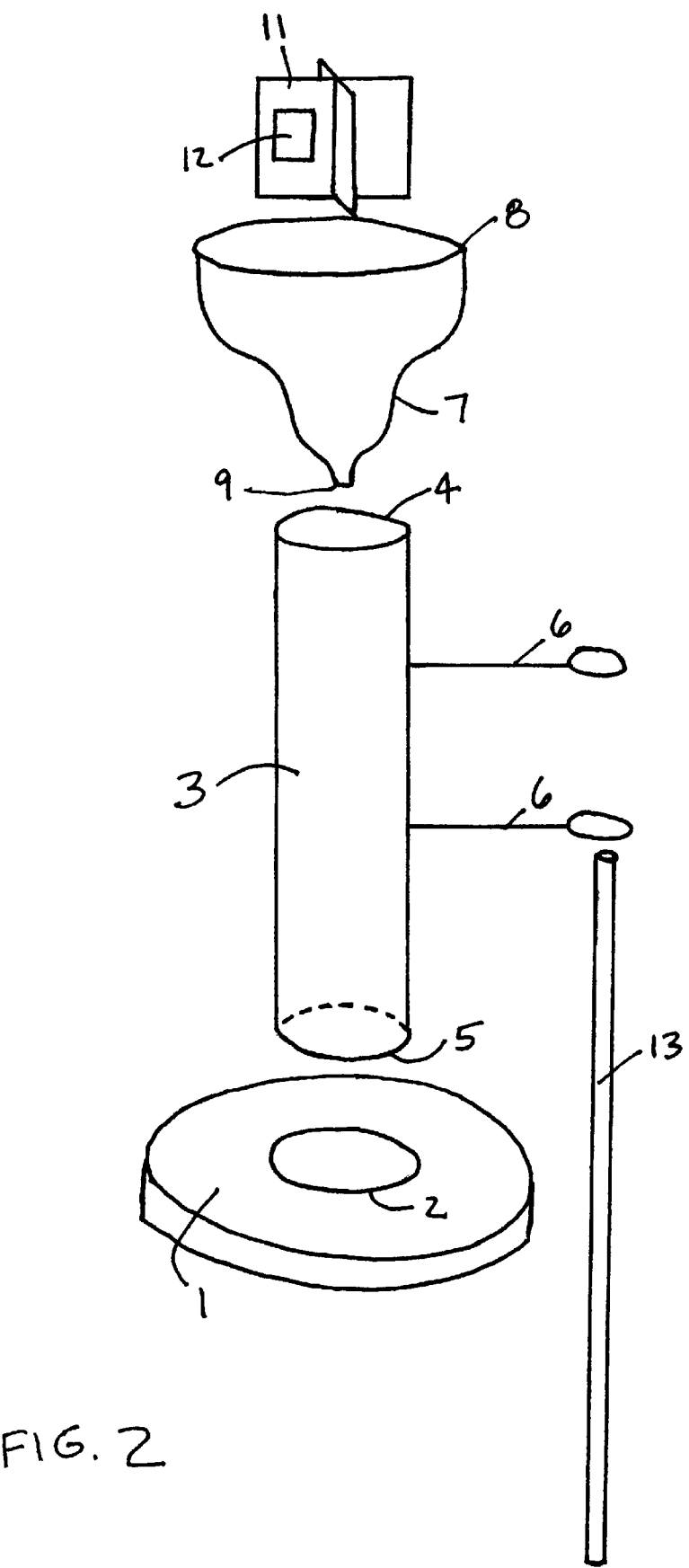
FIG. 2 is an exploded view of a preferred embodiment of the invention.

FIG. 1 is a side elevational view of a preferred embodiment of the invention, a trap for insects, primarily the Japanese beetle. The trap is supported above the surface 16 of a body of water by a floating support 1. The floating support 1 is preferably made of a buoyant material that allows the support to float on a surface 16, such as STYROFOAM, or other rigid polystyrene plastic, or any other sturdy, buoyant material. Preferably, the floating support 1 is toroidal in shape. In a preferred embodiment, the floating support 1 is approximately ten inches in diameter and two inches thick. The floating support 1 contains a substantially central aperture 2 for supporting an upright, elongated hollow cylinder 3. The aperture extends through the floating support 1 from the top of the floating support to the water surface 16. Preferably, the upright, elongated hollow cylinder 3 comprises an elongated tube. The hollow cylinder 3 has an open top end 4 and an open bottom end 5. The hollow cylinder preferably has, but need not have, a circular cross-section. The open bottom end 5 preferably is fitted into the aperture 2. Alternately, the open bottom end 5 may be placed above the aperture 2 without actually being fitted into the aperture 2. FIG. 2 shows an exploded view of a preferred embodiment of the present invention. The hollow cylinder 3 and the aperture 2 in combination define an open pathway 10 through which an insect 14 may fall, landing upon the water surface 16. In a preferred embodiment, the aperture 2 measures slightly more than four inches in diameter for accommodating a hollow cylinder 3 having a diameter of approximately four inches. The hollow cylinder, preferably, is at least forty-eight inches tall.

A funnel 7, or other similar means for directing the insects 14 into the cylinder, is located above and coupled to the open top end 4 of the cylinder. The funnel 7 has an upwardly facing entrance opening 8 and a downward facing exit opening 9. The entrance opening 8 is substantially wider than the exit opening 9 so that the contour of the funnel 7 directs the insects 14 into the cylinder 3. The funnel 7 should be, but need not be, fitted into the top end 4 of the cylinder 3 such that the exit opening 9 of the funnel 7 extends into the open top end 4 of the cylinder 3. In a preferred embodiment, the entrance opening 8 is approximately six inches in diameter at the widest point, and the funnel 7 is fitted into the cylinder 3 such that the exit opening 9 at the bottom of the funnel extends approximately three inches downward from the top of the cylinder 3, while the top of the funnel extends approximately six inches above the top of the cylinder 3. The funnel 7 should have a narrow exit opening 9, preferably approximately one inch in diameter. The exit opening 9 may also be covered with a small, light flap which would not prevent insects from falling into the cylinder 4, but would make it more difficult for insects to travel upward, out of the cylinder 4.

It is preferred that the funnel 7 be fitted into the cylinder 3 such that the top end of the cylinder 4 is sealed by the funnel 7, leaving the exit opening 9 as the only opening into the top end of the cylinder 4. This is desirable to prevent insects 14 that are directed into the cylinder 3 from flying upward and escaping from the trap. With the addition of the funnel 7, the pathway 10 through which the insect 14 will fall is defined by the combination of the funnel 7, cylinder 3, and aperture 2 of the floating support 1.

Coupled to the entrance opening 8 of the funnel 7 is a scent-based means for luring 11 the insect 14 into the funnel 7. This means for luring 11 is preferably a standard commercial odor-based insect trap, such as the SURE FIRE Japanese Beetle Trap. The means for luring 11 is supported by the funnel 7, and preferably is fitted into the funnel entrance opening 8 while part of the means for luring 11 extends above the edge of the funnel entrance opening 8, preferably at least three inches. The means for luring 11 may also be located within the cylinder 3 to further draw the insects onto the water surface 16.

The means for luring includes a scent-based attractant 12, such as a pheromone or floral scent pad, which has been applied to the means for luring 11. In a standard scent-based insect trap, the attractant 12 may need to be reapplied yearly. Since the invention is designed primarily, though not exclusively, for trapping the Japanese beetle, a pheromone would preferably be designed to attract Japanese beetle males, while a floral scent may simultaneously be used to attract the Japanese beetle females. These attractants are commonly available. Similarly, a light may be used to attract insects into the trap.

For helping to anchor the insect trap of the present invention, and for keeping the trap upright, a means for anchoring the trap 13 may be used. The means for anchoring the trap 13 in a preferred embodiment comprises an upright rod, which is anchored to a ground surface 17 underneath the water surface 16. A set of eyebolts 6 may be coupled to the cylinder 3, or elsewhere along the insect trap, for vertically slidingly coupling the insect trap to the means for securing the trap 13. The eyebolts 6 should extend from the cylinder 3 for a distance farther than the edge of the floating support 2. This is helpful so that the trap may be supported by the means for holding the trap upright without leaning toward the means for holding the trap upright so as to keep the trap as close to a normal alignment with the water surface 16 as possible. The use of eyebolts allows the insect trap to rise and lower with the water surface 16 upon which the insect trap is floating, while maintaining the upright orientation of the trap. The rod employed in a preferred embodiment is approximately ten feet in length, though this length of course can vary according to the depth of the body of water in which the invention is used. Many other variations may be used to hold the trap in one location and prevent it from blowing or falling over.

The insect trap of the present invention should be placed at a distance of six or seven feet, or less, from the bank of the body of water in which the trap may be used. In a preferred embodiment, all parts of the trap are colored green except for the means for luring 11 and the attractant 12 applied to the means for luring. When the invention is in use, the insects, such as the Japanese beetles, are attracted to the scent-based means 11 for luring the insects. The insects will then fall into the entrance opening 8 of the funnel 7 by way of errant flying in and around the trap, or by falling from the means for luring, or through other means. The insects are directed by the contours of the funnel through the exit opening 9 of the funnel, and into the elongated cylinder 3. The insects are unable to escape from the trap at this point. The insects then fall through the length of the cylinder, through the aperture 2 in the floating support 1, and finally land on the surface 16 of the water below. The insects then drown and may be eaten by the fish 15, which may be present in the water upon which the trap is placed. The length of the elongated cylinder raises the height of the means for luring so that insects will fly towards the attractant. This increases the efficacy of the trap for insects such as Japanese beetles, which tend to avoid the water surface. Because the trap is placed on a body of water, the insects attracted to the trap are lured away from the plants that a user may be trying to protect. Prior art traps tend to lure the insects toward the plants, and insects that are not trapped may cause greater crop damage than would have been present without the existence of a trap. Japanese beetles, in particular, are poor flyers, and it is best that the Japanese beetles flying past the trap are directed towards water. Because the insects captured by the invented trap are deposited on the water below, and may be eaten by aquatic animals below the trap, the trap does not require a user to periodically empty the trap. The accumulation of dead insects within prior art traps is not present with the present invention. The trap requires no power to operate, and the trap is safe, economical, and simple to use.

The foregoing description of a preferred embodiment of the invention has been presented for purposes of illustration and description, and is not intended to be exhaustive or to limit the invention to the precise form disclosed. The description was selected to best explain the principles of the invention and practical application of these principals to enable others skilled in the art to best utilize the invention in various embodiments and various modifications as are suited to the particular use contemplated. It is intended that the scope of the invention not be limited by the specification, but be defined by the claims set forth below.

What is claimed is:

1. An apparatus for trapping insects, including Japanese beetles, comprising:
   a) an upright, hollow cylinder having an open, upwardly facing top end and an open bottom end;
   b) means for floating, having a substantially central opening for supporting the bottom end of the cylinder;
   c) means for directing insects, having an upwardly facing entrance opening and a downwardly facing exit opening, the entrance opening being substantially larger than the exit opening, the means for directing being coupled to the top end of the cylinder;
   d) a scent-based means for luring the insect into the means for directing, the means for luring the insect being operatively coupled to the entrance opening of the means for directing, and
   e) means for holding the apparatus upright
   f) at least one eyebolt secured to the apparatus slidingly coupling the apparatus to the means for holding,
whereby the insect is lured by the scent-based means for luring into the means for directing, the insect falls through the cylinder and through the opening of the means for floating, and the insect lands onto a surface of a body of water.

2. The apparatus of claim 1, wherein the bottom end of the upright, hollow cylinder is fitted into the opening of the means for floating.

3. The apparatus of claim 2, wherein the means for directing is fitted at least into the top end of the hollow cylinder.

4. An apparatus for trapping an insect, including a Japanese beetle, comprising:
   a) buoyant means for supporting the apparatus on a body of water, the means for supporting the apparatus having a substantially central aperture therein extending through the means for supporting the apparatus;
   b) an upright, elongated tube, the tube having a top end and a bottom end, the bottom end of the tube being supported by the means for supporting the apparatus;
   c) means for directing the insect into the tube, the means for directing being fitted into the top end of the tube;
   d) scent-based means for attracting the insect into the means for directing, the means for attracting the insect being supported by the means for directing the insect;
   e) means for holding the apparatus upright, the tube being slidingly coupled to the means for holding the apparatus upright; and
   f) eyebolts for coupling the means for holding the apparatus to the tube,
whereby, in combination, the means for directing the insect, the tube, and the aperture of the means for supporting the apparatus define a pathway through which the insect, being attracted by the scent-based means for attracting, will fall and land onto the surface of the body of water.

5. An apparatus for trapping an insect, including a Japanese beetle, comprising:
   a) a floating support for supporting the apparatus on a body of water, the floating support having a substantially central aperture therein;
   b) an elongated tube having a top end and bottom end, the bottom end of the elongated tube being fitted onto the aperture of the floating support such that an pathway is created which extends from the bottom opening of the tube through the aperture of the floating support to the surface of the body of water;
   c) a funnel having an upward facing entrance opening and a downward facing exit opening, the exit opening being fitted into the top end of the tube;
   d) a scent-based means for attracting the insect into the funnel, the means for attracting being coupled to the entrance opening of the funnel;
   e) means for holding the apparatus upright, the tube being slidingly coupled to the means for holding the apparatus upright; and
   f) eyebolts for coupling the tube to the means for holding the apparatus,
whereby the insect, being attracted to the scent-based means for attracting, will fall through the funnel, into and through the tube, and into and through the aperture of the floating support onto the surface of the body of water.

* * * * *